(12) United States Patent
McFerrin et al.

(10) Patent No.: US 10,498,777 B2
(45) Date of Patent: Dec. 3, 2019

(54) REAL-TIME PUSH NOTIFICATIONS FOR CLOUD-BASED APPLICATIONS

(71) Applicant: Citrix Systems, Inc., Fort Lauderdale, FL (US)

(72) Inventors: Steven Dale McFerrin, Boynton Beach, FL (US); Gustavo Teixeira Pinto, Boynton Beach, FL (US); Philip John Wiebe, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 481 days.

(21) Appl. No.: 14/644,892

(22) Filed: Mar. 11, 2015

(65) Prior Publication Data

US 2015/0261774 A1    Sep. 17, 2015

Related U.S. Application Data

(60) Provisional application No. 61/954,155, filed on Mar. 17, 2014.

(51) Int. Cl.

| H04L 12/18 | (2006.01) |
|---|---|
| H04L 29/06 | (2006.01) |
| H04L 29/08 | (2006.01) |
| G06F 16/958 | (2019.01) |

(52) U.S. Cl.
CPC .......... *H04L 65/40* (2013.01); *G06F 16/958* (2019.01); *H04L 67/02* (2013.01); *H04L 67/26* (2013.01); *H04L 67/34* (2013.01)

(58) Field of Classification Search
CPC .......... G06F 15/16; G06F 3/00; H04W 24/02; H04L 65/40
See application file for complete search history.

(56) References Cited

U.S. PATENT DOCUMENTS

| 7,747,782 B2 * | 6/2010 | Hunt | G06F 16/9577 709/246 |
|---|---|---|---|
| 8,078,856 B1 * | 12/2011 | Righi | G06F 11/2284 713/1 |
| 8,260,881 B1 * | 9/2012 | Paleja | G06F 8/60 709/217 |
| 8,606,923 B2 | 12/2013 | Tekwani | |
| 8,788,881 B2 | 7/2014 | Salomon et al. | |
| 8,825,962 B1 | 9/2014 | Zhu et al. | |
| 9,071,649 B2 | 6/2015 | Tekwani | |
| 9,203,919 B1 | 12/2015 | Zhu et al. | |
| 9,307,006 B2 | 4/2016 | Micucci et al. | |
| 9,319,473 B2 | 4/2016 | Zadorozny et al. | |
| 2004/0133644 A1 * | 7/2004 | Warren | H04L 69/08 709/206 |
| 2005/0044108 A1 * | 2/2005 | Shah | G06F 16/10 |

(Continued)

*Primary Examiner* — Usmaan Saeed
*Assistant Examiner* — David M Nafziger
(74) *Attorney, Agent, or Firm* — BainwoodHuang

(57) ABSTRACT

An improved technique pushes change notifications to application instances running on frontend clients. In accordance with the improved technique, a backend system sends compact change notifications merely to inform the application instances that contents of the data storage container have changed. The application instances may then respond by requesting the changed content of the data storage container. In response to the request, the backend system provides the requested contents.

17 Claims, 9 Drawing Sheets

(56) References Cited

U.S. PATENT DOCUMENTS

| | | | |
|---|---|---|---|
| 2006/0123151 A1* | 6/2006 | Wurst | G06F 3/1207 710/19 |
| 2007/0219976 A1* | 9/2007 | Muralidhar | G06F 16/40 |
| 2010/0268773 A1* | 10/2010 | Hunt | G06F 16/9577 709/203 |
| 2011/0047177 A1* | 2/2011 | McCreight | G06F 21/577 707/769 |
| 2011/0202588 A1* | 8/2011 | Aggarwal | H04L 67/26 709/202 |
| 2012/0290740 A1* | 11/2012 | Tewari | H04W 4/00 709/248 |
| 2012/0311045 A1* | 12/2012 | Sylvain | H04L 51/12 709/206 |
| 2013/0086146 A1* | 4/2013 | Addala | H04L 12/4625 709/203 |
| 2013/0138658 A1* | 5/2013 | Flick | G06F 16/24 707/741 |
| 2013/0179791 A1* | 7/2013 | Polski | H04L 67/26 715/733 |
| 2014/0047413 A1* | 2/2014 | Sheive | H04L 65/403 717/110 |
| 2014/0053283 A1* | 2/2014 | Odom | G06F 21/10 726/30 |
| 2014/0059217 A1* | 2/2014 | Pizurica | H04L 43/08 709/224 |
| 2014/0123200 A1* | 5/2014 | Park | H04N 21/8173 725/110 |
| 2014/0133293 A1* | 5/2014 | Ismail | H04W 28/0289 370/229 |
| 2014/0223452 A1* | 8/2014 | Santhanam | G06F 9/541 719/328 |
| 2014/0293848 A1* | 10/2014 | Varney | H04W 52/0251 370/311 |
| 2014/0337628 A1* | 11/2014 | Amato | H04L 9/0825 713/171 |
| 2014/0365523 A1* | 12/2014 | Wagner | G06F 16/24565 707/770 |
| 2015/0188871 A1* | 7/2015 | Lewis | H04L 51/24 709/207 |
| 2015/0236970 A1* | 8/2015 | Rahman | H04W 4/12 370/216 |
| 2015/0312355 A1* | 10/2015 | Fromentoux | H04W 4/14 709/203 |
| 2016/0004718 A1* | 1/2016 | Lin | G06F 16/1774 707/690 |
| 2016/0092442 A1* | 3/2016 | Gillett | G06F 16/93 707/608 |
| 2017/0054787 A1* | 2/2017 | Kwon | H04L 67/06 |

* cited by examiner

REAL-TIME PUSH NOTIFICATIONS FOR CLOUD-BASED APPLICATIONS

CROSS-REFERENCE TO RELATED APPLICATIONS

Priority is claimed to U.S. Provisional Patent Application No. 61/954,155, filed Mar. 17, 2014, the contents and teachings of which are incorporated by reference herein in their entirety.

BACKGROUND

Cloud-based applications are software applications that employ services available over the Internet or over some other network to assist the applications in performing their tasks. In a typical scenario, a user installs a frontend client (e.g., an "app") on a client device, which connects to a backend server over the Internet. The frontend client typically manages a user interface and performs local processing on the client device, whereas the backend server may access large databases, store user data, and perform computationally intensive tasks. Users currently enjoy a wide variety of cloud-based applications, including applications for data storage, video streaming, web conferencing, mapping, banking, and many others.

A common cloud-based application provides user data storage in the cloud. For example, a user installs a data storage client on the user's device and designates a local folder for storing files. Any time the user adds a file to the local folder, the data storage client automatically uploads the file to a backend system running in the cloud.

Some cloud-based applications automatically push changes in data stored in the cloud to various frontend clients. In one scenario, for example, a user runs an app on a smartphone as well as on a second device, such as a tablet computer. When the user runs the app on the smartphone, the app generates changes in a local file, which the app automatically uploads to the backend system running in the cloud. The backend system then accesses an account of the user, finds that the user's account is associated with both the smartphone and the tablet computer, and pushes the changes in the file to the tablet computer.

SUMMARY

Unfortunately, conventional cloud storage services are slow to update frontend clients with changes in data. For example, a backend system may become bogged down as a result of queuing updates and pushing large amounts of data to user devices. Also, slow processing by the backend system may cause changes in data stored on the backend system to get out of sync with changes arriving from different devices, causing the backend system to effect changes in data out of proper sequence.

In contrast with the above-described conventional approach, an improved technique pushes changes from a backend system to one or more application instances running on frontend clients by sending compact change notifications merely to inform the application instance(s) that contents of data stored on the backend system have changed. The application instance(s) may then respond by requesting the changed contents from the backend system, which may in turn respond by providing the changed contents.

Advantageously, the improved technique provides change notifications essentially in real time, nearly instantaneously with changes made on the backend system. Because the change notifications are compact, they do not excessively burden the backend system. For example, the backend does not waste time attempting to push large amounts of data to application instances on devices that are turned off or unavailable. Large data transfers occur only on request from application instances, reducing the overall burden on the backend system.

Certain embodiments are directed to a method of providing push notifications in a backend system that provides services for supporting cloud-based software applications. The method includes, in response to a change in contents of a data storage container, sending, from the backend system over a network, a change notification to a set of application instances of a cloud-based software application, the change notification including a message that indicates that the contents of the data storage container have changed. The method also includes receiving a request from each of the set of application instances to obtain changed contents of the data storage container. The method further includes, in response to receiving each such request, supplying the changed contents of the data storage container to each of the set of application instances.

Other embodiments are directed to a backend server constructed and arranged to perform the method described above. Still other embodiments are directed to a computer program product embodying a non-transitory, computer-readable medium. The non-transitory, computer-readable medium stores instructions, which, when executed on one or more processors units of backend system, cause the backend system to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique pushes changes from a backend system to one or more application instances running on frontend clients by sending compact change notifications merely to inform the application instance(s) that contents of data stored on the backend system have changed. The application instance(s) may then respond by requesting the changed contents from the backend system, which may provide the changed contents upon request.

To assist the reader, this detailed description is provided in sections as follows:

Section I provides an overview of an example environment and techniques for storing data on a backend system.

Section II describes a technique for sending push notifications in the environment described in Section I.

Figure 1:
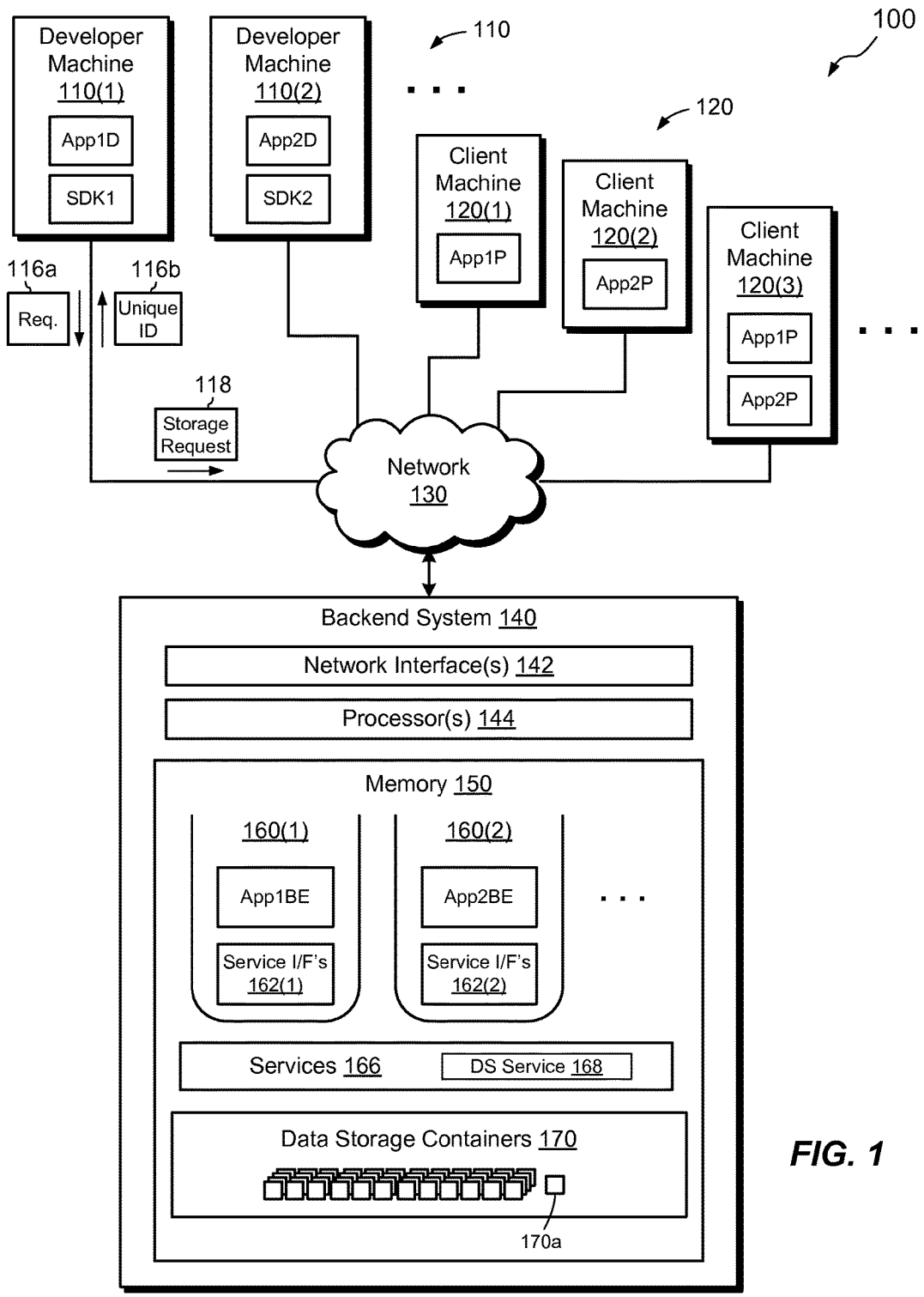
FIG. 1 is a block diagram of an example environment in which embodiments of the invention hereof can be practiced.

Section I: Overview of Example Environment and Techniques for Storing Data on a Backend System FIG. 1 shows an example environment 100 in which embodiments of the improved technique hereof can be practiced. Here, developer machines 110 (110(1), 110(2), etc.) and client machines 120 (e.g., 120(1), 120(2), etc.) connect to a backend system 140 over a network 130. Typically, a software developer operates each of the developer machines 110 and an end user operates each of the client machines 120. Each of the developer machines 110 runs a development version of a frontend client (e.g., App1D, App2D), such as a software program or "app," as well as a software development kit (e.g. SDK1, SDK2), which a developer may use for programing the frontend client to access services on the backend system 140. Different SDKs may be provided for different front-end computing platforms (e.g., Windows, OSX, iOS, Android, etc.) and/or for different computer languages (e.g., Java, Ruby, Rails, Python, Node, Objective C, etc.). In some examples, developer machines 110 access backend services directly, e.g., using a REST (Representational State Transfer) interface, without the need for an SDK.

Each of the client machines 120 includes a production version of one or more frontend clients (e.g., App1P, App2P). In this example, App1P is a production version of App1D and App2P is a production version of App2D. Of course, developer machines 110 may also run production versions of client frontends. In addition, any of the machines 110 and 120 may run any number of frontend clients. It should be understood that the arrangement as shown is merely illustrative.

In an example, the backend system 140 provides services both for developing cloud-based applications and for hosting cloud-based applications and features. Thus, the backend system 140 may be used at various times or simultaneously both by developer machines 110 and by client machines 120. The backend system 140 is seen to include one or more network interfaces 142 (e.g., Ethernet and/or Token Ring cards), a set of processors 144 (e.g., one or more processing chips, blades, and/or assemblies), and memory 150. The memory 150 includes both volatile memory (e.g., RAM) and non-volatile memory, such as one or more disk drives, solid state drives, data storage arrays, and the like.

The memory 150 stores software constructs for realizing application sandboxes 160(1), 160(2), etc. (as many as desired), as well as services 166 and data storage containers 170. The data storage containers 170 provide data storage for the above-described first and second cloud-based applications, and, generally, for any cloud-based applications that the backend system 140 supports. A set of storage devices (e.g., disk drives, flash drives, memory chips, etc.) of the memory 150 provide physical media for storing the data storage containers 170.

In an example, each of the application sandboxes 160(1) and 160(2) is dedicated to a respective cloud-based application and operates a respective application backend for supporting the cloud-based application. For example, sandbox 160(1) operates a backend App1BE for supporting a first cloud-based application and sandbox 160(2) operates a backend App2BE for supporting a second cloud-based application. Here, App1BE is the backend that supports frontends App1D and App1P. Likewise, App2BE is the backend that supports frontends App2D and App2P. Note that the backends may be segregated into development and production versions, in a manner similar to that shown for the frontends. In an example, application developers write the application backends either in situ on the backend system 140 (e.g., over a web interface) or on developer machines (e.g., 110). Developers may upload backends written on developer machines to the backend system 140 once the locally-developed backends are ready to be deployed. It should be understood that some cloud-based applications may not require application backends, per se. For example, some frontend clients 110 or 120 may access the services 166 directly over the network 130 without the use of application backends.

As shown, the services 166 include a data storage (DS) service 168. The data storage service 168 manages the creation and destruction of data storage containers 170. The data storage service 168 also manages the storage and retrieval of data to and from the data storage containers 170 and performs other functions. Although this document refers to a data storage service 168 in the singular form, it should be understood such the data storage service 168 may include any number of services, functions, methods, procedures, and so forth, which operate to manage data storage and associated activities. The services 166 and data storage service 168 are so named because they perform services for cloud-based applications and not because they are categorized as "services" according to any particular operating system (e.g., these "services" are required to be Windows services in the Windows operating system). Rather, the backend system 140 may implement the services 166 and 168 in any suitable software construct or constructs.

In the example shown, each of the application sandboxes 160(1) and 160(2) has a respective set of service interfaces, 162(1) and 162(2). Although the services 166 may be common across the entire backend system 140, the service interfaces 162(1) and 162(2) are each particular to a respective sandbox, such that developers can access services within the context of each of the application sandboxes 160(1) and 160(2) as if those services were specific to the respective application.

The developer machines 110 and the client machines 120 may each be implemented with any type of device (or devices) having control circuitry (e.g., processing circuitry and memory), which is provisioned for executing application frontends and communicating over the network 130. The different machines 110 and 120 may be implemented with any type or types of devices, and the types of devices need not be the same. Such devices may be stationary devices (e.g., servers, desktop computers, set top boxes, gaming systems, etc.) or mobile devices (laptops, tablet computers, smart phones, personal readers, etc.). The environment 100 may include any number of developer machines 110 and/or client machines 112, and the environment 100 need not include both types of machines. The network 130 may be realized with any type of network or networks, such as the Internet, a WAN (wide area network), a LAN (local area network), or any other network or combination of networks. The network 130 may be implemented with various technologies, such as with wired and/or wireless technologies, telephone systems, cell phone systems, microwave systems, infra-red systems, and the like.

The backend system 140 may be provided as a server-grade computing system that includes any number of individual computers, networking components, and data storage arrays, which operate together as a single system. However, the server 140 is not limited to large-scale deployments and may be implemented on any scale with any number of computing devices, including with a single computing device. The set of processors 144 and the memory 150 of the backend system 140, within its constituent device or devices, together realize control circuitry, which is constructed and arranged to carry out various methods and functions as described herein. Also, the memory 150 includes a variety of software constructs realized in the form of executable instructions. When the executable instructions are run by the set of processors 144, the set of processors 144 are caused to carry out the operations of the software constructs. Although certain software constructs are specifically shown and described, it is understood that the memory 150 typically includes many other software constructs, which are not shown, such as an operating system and various applications, processes, and daemons. The backend system 140 is amenable to implementation on physical machines as well as on virtual machines.

An example will now be presented for creating a new data storage container 170a in the backend system 140 at the request of the first cloud-based application. Although this example relates to a particular data storage container created at the request of the first cloud-based application, it should be appreciated that this example can be applied more generally to describe the creation of any data storage container 170 by any cloud-based application.

In this example, the data storage service 168 in the backend system 140 receives a request 116a from the first cloud-based application to create a new data storage container 170a. The request 116a may arrive from the frontend client App1D on the first developer machine 110(1), as shown, or from any other instance of App1D, or from any instance of App1P. Alternatively, the request 116a may arrive from the backend App1BE or from any of the services 166, i.e., from a location internal to the backend system 140.

In response to the data storage service 168 receiving the request 116a, the data storage service 168 creates the new data storage container 170a. For example, the data storage service 168 generates metadata for the data storage container 170a and stores such metadata in a database in the backend system, the purpose of the database being to track information about data storage containers.

The data storage container 170a provides a logical container for storing data and has no assignment by the data storage service 168 to any end user of the first cloud-based application. Although the first cloud-based application may certainly have end users (e.g., users of various client machines 120), the data storage service 168 creates the data storage container 170a without any assignment to any end user. For example, the data storage service 168 does not assign the data storage container 170a to any end user account, nor does it store any end user ID in the metadata created for supporting the data storage container 170a. Even if the request 116a arrives from one of the clients 120, which is operated by an end user, the data storage service 168 still does not assign any user ID to the data storage container 170a. Rather, the data storage container 170a is user-agnostic. As far as the data storage service 168 is concerned, no end user owns the data storage container 170a. The data storage container 170a is thus completely independent of any end user, both in its definition and in its access by the data storage service 168. As will be described more fully below, the user-agnostic nature of the data storage container 170a (and, similarly, of all data storage containers 170) confers many advantages both to application developers and to users.

Rather than providing access to the data storage container 170a in connection with any end user, the data storage service 168 instead generates a unique identifier (ID) (e.g., 116b) for the data storage container 170a. The data storage service 168 then proceeds to provide access to the data storage container 170a via the unique ID 116b. Generating the unique ID 116b may be conducted before, after, or simultaneously with the act of creating the data storage container 170a. The unique ID 116b uniquely identifies the data storage container 170a from among other data storage containers in the backend system 140. In an example, the unique ID 116b of the data storage container 170a is unique across all of the cloud-based data services provided by the backend system 140, as well as across any similar backend systems that may coordinate with the backend system 140 to provide cloud-based data services to applications. The unique ID 116b may be generated in any suitable way. For example, the unique ID 116b may be generated as an automatically-incrementing integer, by a hash function, or by any other suitable method.

Once the data storage service 168 has created the unique ID 116b, the data storage service 168 provides the unique ID 116b to the first cloud-based application. For example, the data storage service 168 returns the unique ID 116b to the developer machine 110(1), or, for example, to whichever other machine or software construct originated the request 116a (or to any other designated entity). After the first cloud-based application has received the unique ID 116b, the first cloud-based application may use the unique ID 116b for accessing the data storage container 170a, such as for writing data to the data storage container 170a and/or for reading data from the data storage container 170a.

In an example, the backend system 140 (or a software construct operating therein), receives a storage request 118 from the first cloud-based application. The request 118 specifies a set of data to be stored and the unique ID 116b of the data storage container 170a. For example, the frontend client App1D on machine 110(1) sends the storage request 118 to the backend system 140. Upon receiving the storage request 118, the backend system 140, e.g., acting through the data storage service 168, stores the set of data from the request 118 in the data storage container 170a. The first cloud-based application may similarly send a read request to the data storage service 168, by specifying the unique ID 116b of the data storage container 170a, to read data from the data storage container 170a. In response, the first cloud-based application may receive back the contents of the data storage container 170a.

Providing access to data storage containers 170 and their contents based on unique IDs enables cloud-based applications flexibly to assign data storage containers 170 and their contents to particular end users, to groups of end users, or to no end users at all. Because access to data storage containers is based on access to their respective unique IDs, developers can write their cloud-based applications to provide selected users, or no users, with access to data storage containers at their own option. But granting access to users is done at the application level and not in the data storage services 168 or in the data storage containers themselves, which remain user-agnostic.

Data storage containers need not ever be assigned to any user at all. For example, a cloud-based application may request a new data storage container and proceed to store application settings for the cloud-based application in the newly created data storage container. The application settings may pertain to the application but not to any particular end user of the application. The data storage container storing the application settings may thus never have an assignment to any end user.

In some examples, in addition to being user-agnostic, data storage containers 170 are also application-agnostic. For example, a data storage container need not include in its definition any application-based context Likewise, the data storage service 168 need not assign the data storage container to any cloud-based application. Rather, the data storage service 168 may flexibly provide the unique ID of a data storage container, upon request, to any number of cloud-based applications, enabling multiple cloud-based applications to share data amongst one another.

It is thus evident from the foregoing that software developers may use the data storage service 168 to provide cloud-based data storage in the applications they design, without requiring such developers to build their own backend storage solutions or requiring users to log on to a separate storage service. Because the data storage service 168 is user-agnostic, it can provide storage containers for use with any applications or users that have the respective unique IDs. The burden and inconvenience to users and developers associated with conventional cloud-based storage solutions are therefore overcome.

Figure 2:
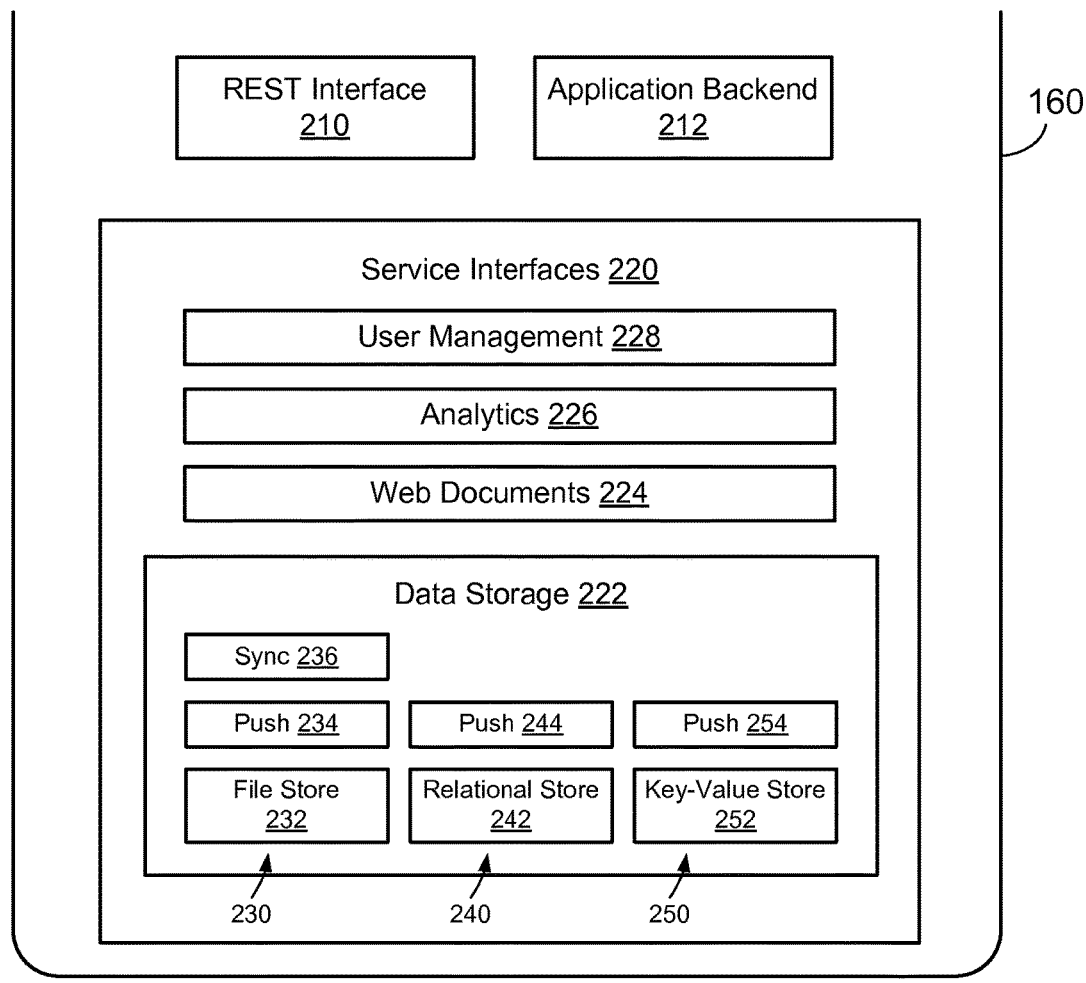
FIG. 2 is a block diagram of an example application sandbox, as shown in FIG. 1.

FIG. 2 shows an example application sandbox 160 in additional detail. The application sandbox 160 may be representative of the application sandboxes 160(1) and 160 (2) of FIG. 1. For example, the sandbox 160 includes an application backend 212, which may correspond, for example, to backends App1BE and App2BE of sandboxes 160(1) and 160(2), respectively. The sandbox 160 further includes service interfaces 162, which correspond, for example, to the service interfaces 162(1) and 162(2) as seen in FIG. 1. The application sandbox 160 further includes a REST (Representational State Transfer) interface 210, for communicating with application frontends (e.g., App1D, App1P, App2D, and App2P). In an example, the REST interface 210 exposes an API (application programming interface) for providing the frontends with access to the application backend 212 and to the backend services 166 (FIG. 1), i.e., through the service interfaces 162.

In an example, the application sandbox 160 (or each instance thereof running on the backend system 140) provides backend support for a respective cloud-based application, from the standpoints of both developers and end users. The application sandbox 160 may support multiple instances of the cloud-based application simultaneously, e.g., as a consequence of multiple frontends running on machines 110 and 120.

The service interfaces 162 provide interfaces (e.g., APIs) into the services 166 (FIG. 1) in such a way that the services 166 as accessed through the service interfaces 162 are scoped to the application sandbox 160 and thus to the particular cloud-based application supported by the application sandbox 160. The service interfaces 162 are seen to include, for example, a data storage service interface 222, a web documents service interface 224, an analytics service interface 226, and a user management service interface 228. The service interfaces 222, 224, 226, and 228 provide access to respective sets of services 166 (FIG. 1). For example, the data storage service interface 222 provides access to the data storage service 168. Likewise, the web documents service interface 224 provides access to a web documents service (within the services 166), the analytics service interface 226 provides access to an analytics service, and the user management service interface 228 provides access to a user management service.

In an example, the particular cloud-based application served by the application sandbox 160 may operate any of the service interfaces 222, 224, 226, and 228 at the application's own option, in accordance with the application's own programming. For example, some cloud-based applications may include their own user management, analytics, and/or web documents, and thus may opt out of using the corresponding services 166 on the backend system 140 in favor of using their own.

It should be understood that nothing in the backend system 140 in any way prevents the existence or management of end users of cloud-based applications that the backend system 140 supports. Indeed, a user management service may expressly be provided. However, any such user management service is decoupled from data storage service 168 accessed through the data storage interface 222. Thus, for example, applications may avail themselves of the user management service (through interface 228) to authenticate end users and authorize them to access various resources. But such user management is provided by the cloud-based application itself, e.g., acting alone or in connection with the user management service. In any case, any such user management service is separate and distinct from the data storage containers 170 managed by the data storage service 168.

In some examples, the application sandbox 160 is configured to generate credentials for particular services upon request. For example, the application sandbox 160 generates each credential based on a key and a secret. Once a credential is generated for a particular service, for example, the credential is thereafter required for accessing that service. Each credential may be selectively scoped to any of the services 166, including to the data storage service 168. Thus, for example, a cloud-based application may request a credential for accessing a particular data storage container 170. The generated credential is agnostic to any end user or application, but the cloud-based application receiving the credential may provide it to any user, group of users, and/or application. Any entity in possession of the credential may then access the data storage container 170 by supplying an access request, which includes both the data storage container's unique ID and the credential.

Considering the data storage interface 222 in additional detail, it is seen that the interface 222 includes sub-interfaces 230, 240, and 250. In an example, data storage containers 170 (FIG. 1) are provided in three distinct types: file, relational, and key-value. Each of the data storage containers 170 is configured for storing one of these three types of data. Other types of data, and/or a greater or fewer number of types of data, may be provided; those shown are merely illustrative. Here, the sub-interfaces 230, 240, and 250 provide access to the data storage service 168 for file-type data, relational-type data, and key-value-type data.

Each of the sub-interfaces 230, 240, and 250 includes a respective "store" service interface (i.e., 232, 242, and 252) for accessing data storage service 168 to create and destroy data storage containers of the respective type, to read and write data storage containers of the respective type, and to maintain their metadata. Each of the sets of sub-interfaces 230, 240, and 250 also includes a respective "push" service interface (i.e., 234, 244, and 254). Each push service interface provides access to the data storage service 168 for pushing changes in contents of underlying data storage containers to one or more subscribing application instances. In addition, the file-type sub-interface 230 includes a file sync service interface 236. The file sync service interface 236 provides access to the data storage service 168 for synchronizing changes in contents of underlying file-type data storage containers among subscribing application instances.

In an example, each data storage container 170 for file-type data may store any number of files and/or folders, organized in any suitable folder structure. The hierarchy may reflect, for example, a folder hierarchy as may be found on a typical Windows or OSX computer.

Each data storage container 170 for relational data may store data in database form. For example, a data storage container 170 storing relational data may store data in schemaless database format, such as in NoSQL format. Rather than having to implement relational databases in the backend system 140, developers may instead operate an SDK (FIG. 1) to define classes and fields specific to their applications. Developers may further operate the SDK to establish relationships among classes and fields, such as one-to-one, one-to-many, many-to-one, and many-to-many. Cloud-based applications may then read and write relational data to the defined fields and classes, and may execute queries and generate reports, without having to deploy relational database solutions.

Each data storage container 170 for key-value data may simply store a key and a corresponding value. For example, a data storage container 170 may store data for a person's first name by specifying a key, e.g., "FirstName," and a corresponding value, e.g., "Phil."

It has thus been described that the application sandbox 160 performs various activities on behalf of a particular cloud-based application. These activities include providing a REST interface 210 to application frontends, housing an application backend 212, and providing interfaces 162 to a variety of backend services 166. The backend services 166 include the data storage service 168 for creating and managing data storage containers 170 for three types of data (file, relational, and key-value), for pushing changes in underlying content to subscribing application instances, and for providing services for synchronizing file-type data across subscribing application instances.

Figure 3A:
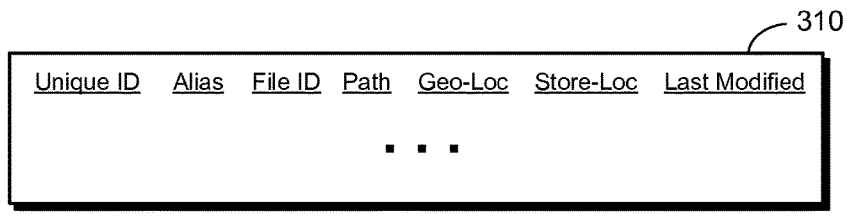
FIGS. 3a-3c are diagrams showing example databases for realizing data storage containers and/or metadata thereof, for file-type data, relational data, and key-value data, respectively.
Figure 3B:
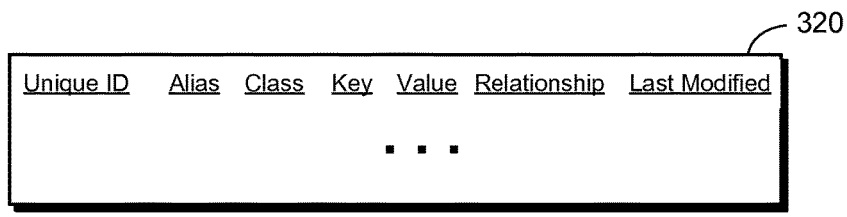
Figure 3C:
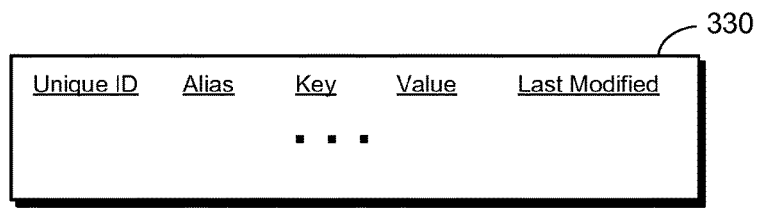

FIGS. 3a, 3b, and 3c show example databases 310, 320, and 330 for storing data and/or metadata for file-type data storage containers, relational-type data storage containers, and key-value-type data storage containers, respectively. In an example, the databases 310, 320, and 330 are realized in the memory 150 of the backend system 140 and are accessible by the data storage services 168. In some examples, certain of the databases 310, 320, and 330 store contents of particular data storage containers 170 as well as metadata describing their contents, although this is not required. In addition, the databases 310, 320, and 330 may be realized in any number or type of database structures. For example, the databases 310, 320, and 330 may be provided together in a single database or separately in multiple databases.

FIG. 3a shows the database 310 for storing metadata for file-type data storage containers. In an example, each row of the database 310 (rows are indicated with ellipsis) stores metadata pertaining to a respective file-type data storage container, which may contain a respective file or folder. In an example, the database 310 organizes metadata for file-type data storage containers in the following fields:

"Unique ID." The unique ID that the data storage services 168 have generated for the data storage container represented in the current row. In an example, each file has a unique ID and each folder has a unique ID. No two rows have the same unique ID.

"Alias." A developer-assigned alphanumeric name, which may be used in place of the Unique ID when accessing the data storage container. In an example, a request to create a data storage container (like the request 116a) includes a parameter that specifies an alias as alphanumeric text. When creating a data storage container in response to the request, the data storage services 168 store the alias as metadata in the database 310 in connection with the data storage container, such that subsequent accesses to the data storage container may specify the alias in place of the unique ID, which may be long and/or difficult to remember.

"File ID." If the current row identifies a file, then the File ID is a hash of the file's contents. If the current row identifies a folder, then the File ID is a hash of the folder's contents. File IDs uniquely identify files and folders based on their contents, and thus may be useful in identifying and removing redundant copies of files and folders.

"Path." A path to the file or folder on the user's machine. In an example, the indicated Path is relative to some designated root location, which has been created on the user's machine to store application content.

"Geo-Loc." Geolocation information (if available) of the device that created the data storage container represented in the current row. Geo-Loc may include, for example, GPS coordinates of the user's machine at the time the container was created, as well as a timestamp.

"Store-Loc." The location of the file or folder described by the current row in physical or logical storage. The Store-Loc thus provides a way of accessing the underlying contents of the file or folder from one or more storage devices (e.g., disk drives).

"Last Modified" timestamp. The last date and time that the data storage service 168 last modified the file or folder described by the current row.

Those skilled in the art will recognize that the database 310 may be structured in a variety of ways and may include a variety of fields, including fields that are different from those shown and described.

FIG. 3b shows a database 320 for relational-type data storage containers. The database 320 may include fields for "Unique ID," "Alias," and "Last Modified," which are similar to the like-named fields described in connection with the database 310. Here, however, fields may also be provided for "Class," "Key," "Value," and "Relationship." In an example, a "Class" may represent a table of a database structure being defined for a respective relational-type data storage container. A "Key" may represent a database field within the table, and a "Value" may represents the value to which the "Key" has been set. A "Relationship" may represent how a current field relates to other fields and classes. The table 320 may include additional or different fields, depending on the type of relational data to be stored. Unlike the database 310, which stores locations of underlying content (files and/or folders), the database 320 may store the actual contents of relational data. Thus, in some examples, the database 310 includes both metadata and relational data. In other examples, however, the metadata and relational data may be separated in different databases or data structures.

FIG. 3c shows a database 330 for key-value-type data storage containers. The database 330 may include fields for "Unique ID," "Alias," and "Last Modified," which are similar to the like-named fields described in connection with the database 310. The database 330 may also include fields for "Key" and "Value," which hold keys and respective values of key-value pairs stored in the key-value-type data storage containers. As with the database 320, the database 330 may store both metadata and data. Alternatively, the metadata and data may be stored separately.

Figure 4:
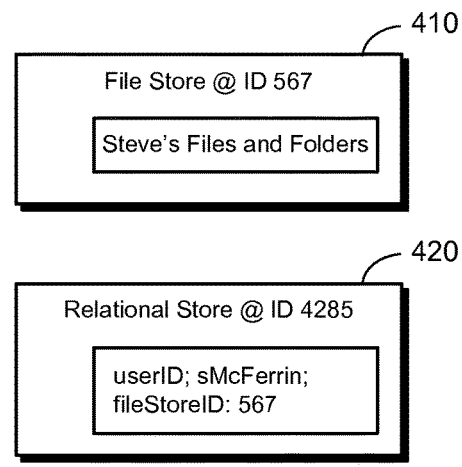
FIG. 4 is a block diagram showing an example arrangement in which a first data storage container stores files of an end user and a second data storage container stores both a user ID of the end user and a unique ID of the first data storage container.

FIG. 4 shows an example of one data storage container storing information about another. Here, a cloud-based application creates a file-type data storage container 410 at unique ID 567 and stores therein files and folders belonging to a user, "Steve." The cloud-based application also creates a relational-type data storage container 420 at unique ID 4285 and stores therein two key-value pairs. A first key-value pair associates a "userID" key with a corresponding value, "sMcFerrin," and a second key-value pair associates a "fileStoreID" key with a corresponding value, "567." In an example, the data storage service 168 writes this key-value data to the data storage container 420 in response to a user storage request directed to the second data storage container 420. In accordance with its programming, the cloud-based application may interpret these key-value pairs to mean that the unique ID for the file-type data storage container belonging to "sMcFerrin" is "567." This example thus shows how a cloud-based application can use inherently user-agnostic data storage containers to store data that assists with user management.

Figure 5:
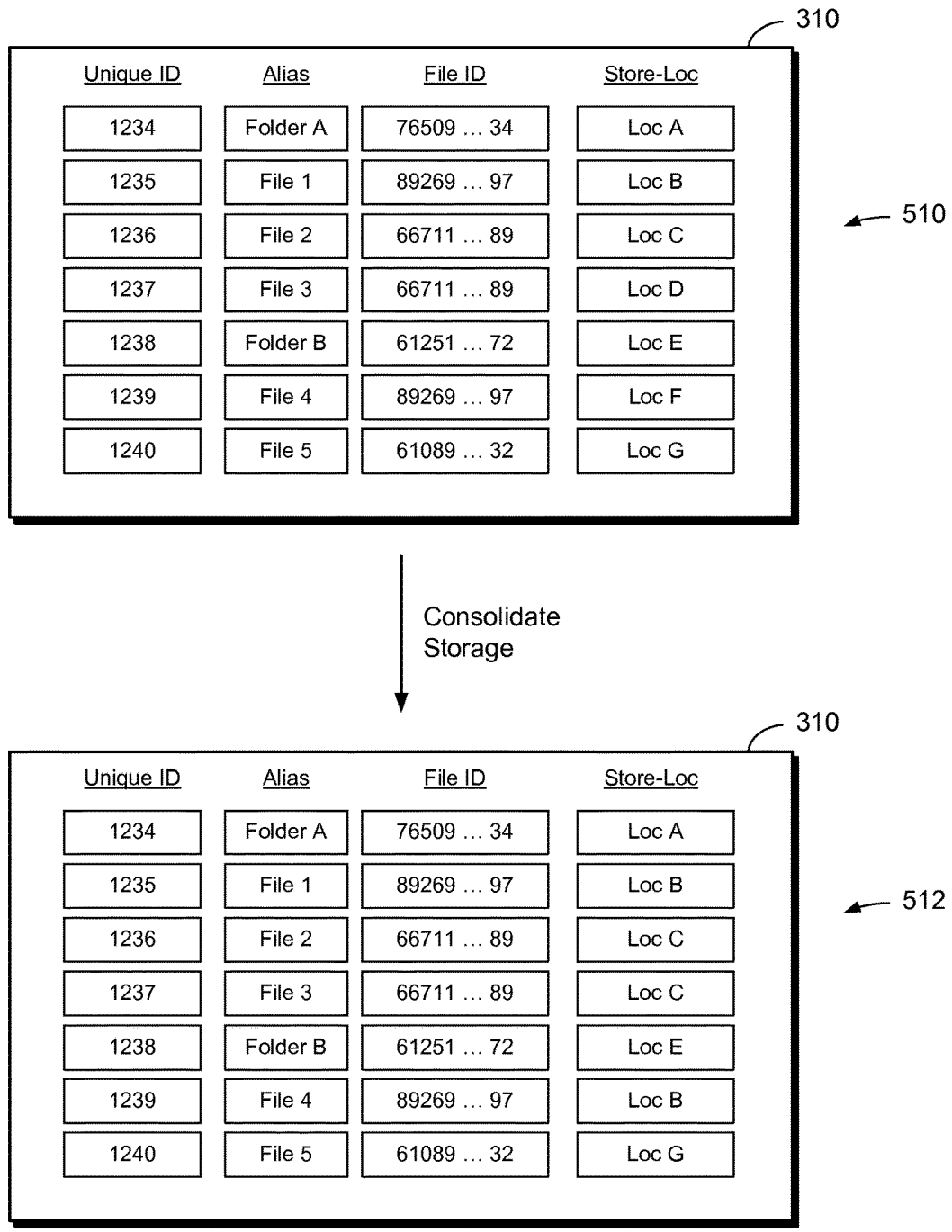
FIG. 5 is a diagram showing an example arrangement for removing redundant copies of data storage containers.

FIG. 5 shows an example arrangement for consolidating storage of file-type data stored in different file-type data storage containers, thus making more efficient use of back-end storage. The illustrated arrangement shows portions of the database 310 (FIG. 3a). Certain fields and entries of the database 310 have been omitted from FIG. 5 for the sake of simplicity. The arrangement of FIG. 5 shows the storage of metadata for file-type data storage containers both in a first state 510, before removing redundant storage, and in a second state 512, after removing redundant storage.

As seen in the first state 510, the database 310 includes metadata for seven file-type data storage containers having consecutive Unique IDs ranging from 1234 to 1240. Some of the illustrated data storage containers store files while others store folders. Each data storage container has a respective Alias, File ID, and Store-Loc, where the File ID provides a hash of the contents of the data storage container and the Store-Loc provides a location on physical media (e.g., disk) of those contents. In this first state 510, each data storage container has a different value of Store-Loc, indicating that each data storage container consumes its own respective back-end storage.

In accordance with further improvements hereof, the data storage service 168 searches the database 310 to find duplicate file content and performs consolidation operations to liberate backend storage if any duplicate content is found. As the File ID provides a hash of a data storage container's contents, the data storage service 168 can compare hash values as an efficient proxy for comparing content. The data storage service 168 thus searches the database 310 for matching values of File ID. For any matches that are found, the data storage service 168 liberates the backend storage of each redundant copy and changes the Store-Loc field of each redundant copy to reflect the physical storage location of the single retained copy.

For example, as shown in the second state 512, the data storage service 168 has changed the Store-Loc value for Unique ID 1237 (alias "File 3") to match that of Unique ID 1236 (alias "File 2"). This change reflects the fact that the data storage service 168 has found a match between the contents of File 3 and those of File 2, as indicated by their matching File IDs. Likewise, the data storage service 168 has changed the Store-Loc value for Unique ID 1239 (alias "File 4") to match that of Unique ID 1235 (alias "File 1"). This change reflects the data storage service 168 having found a match between the contents of File 4 and those of File 1. In this example, the data storage service 168 has freed the backend storage found at Loc D and Loc F, which is no longer needed to support storage of File 3 and File 4. The data storage service 168 may repurpose the freed storage to support storage of other data.

The scope of the above-described process of consolidating redundant storage may be varied and may be controlled by the developer. For example, a developer may expressly limit the scope of consolidation services to (1) a set of data storage containers, (2) a particular cloud-based application, or (3) a set of cloud-based applications, for example. Consolidation then operates within the designated scope but not outside it. For example, if the scope of consolidation is limited to a particular cloud-based application, then the data storage service 168 may search for and free redundant backend storage for file-based data storage containers created by that cloud-based application, but not in data storage containers created by other cloud-based applications.

Figure 6:
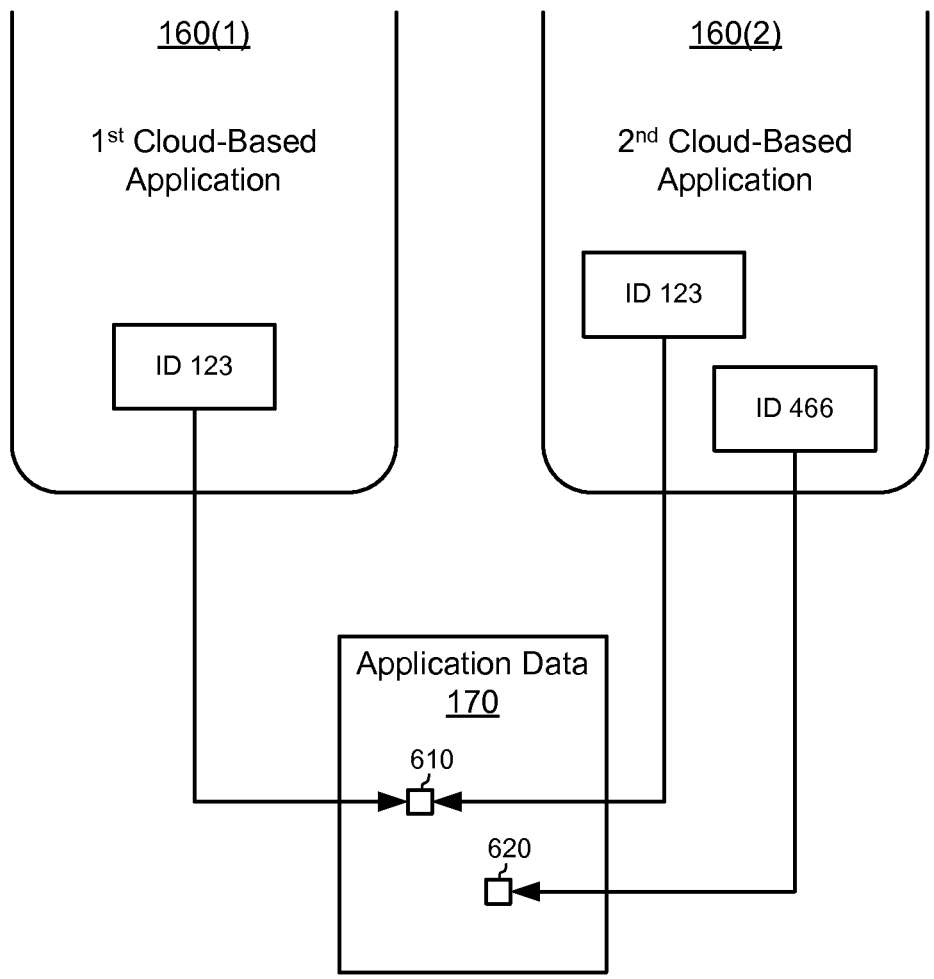
FIG. 6 is a diagram showing an example arrangement in which a data storage container is accessed from multiple cloud-based applications.

FIG. 6 shows an example arrangement in which a data storage container may be shared among different cloud-based applications served from respective application sandboxes. Here, a first cloud-based application served by application sandbox 160(1) has access to a data storage container 610 at unique ID 123. At the same time, a second cloud-based application served by application sandbox 160(2) has access to the same data storage container 610 at unique ID 123. The second cloud-based application may further have access to another data storage container 620 at unique ID 466. Both the first cloud-based application and the second cloud-based application can thus read and write contents of the data storage container 610 via respective read and write requests. Although each data storage container is typically created by a respective cloud-based application served by a respective application sandbox, the creating application may engage in a protocol with another application to grant the other application access to the data storage container. Thus, in this example, the data storage container 610 is not only user-agnostic, but also application agnostic, as it may be accessed from multiple cloud-based applications served by respective application sandboxes.

Section II: Real-time Push Notifications

Figure 7:
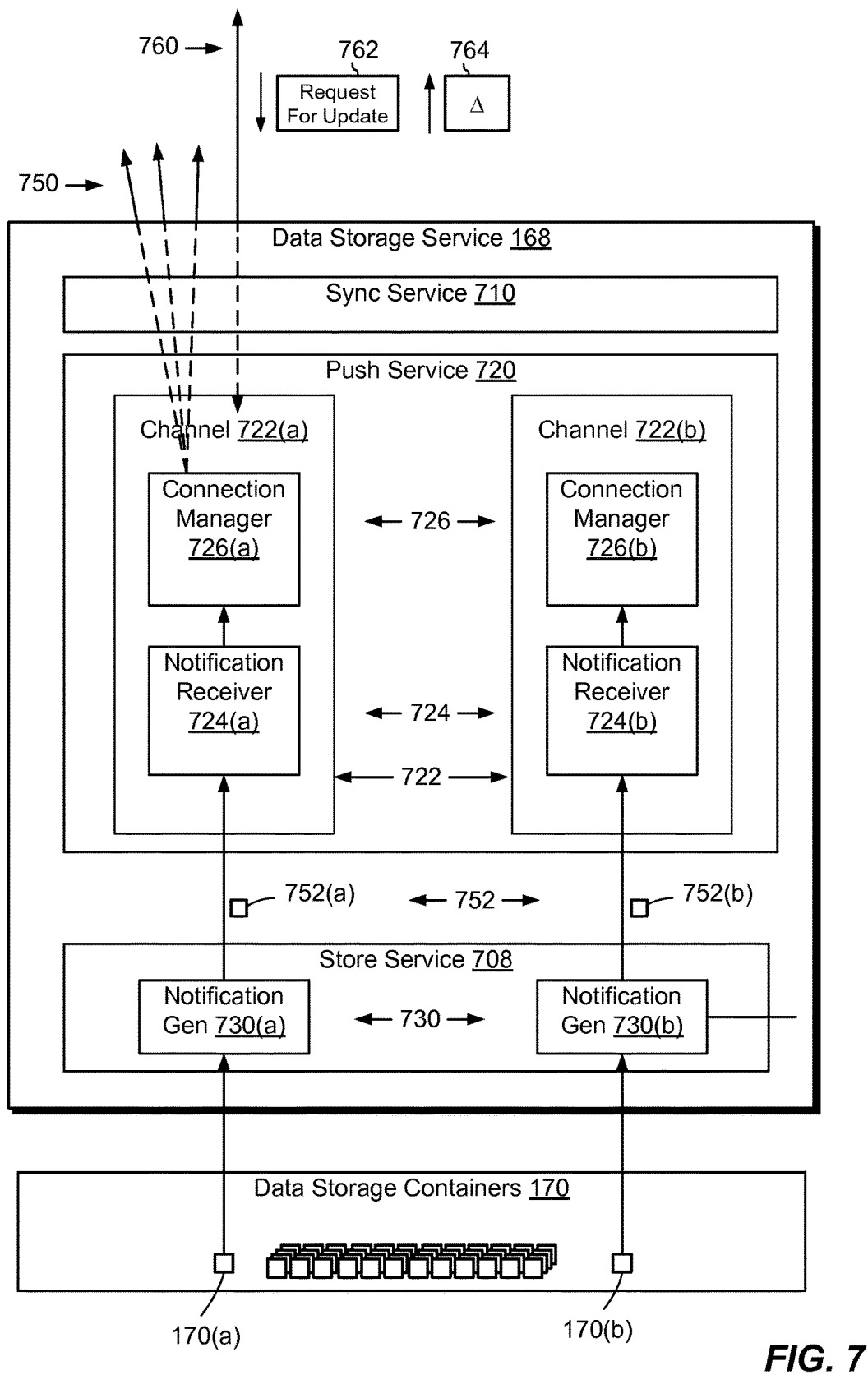
FIG. 7 is a block diagram showing an example arrangement in which change notifications are generated and pushed to application instances via a push service.

FIG. 7 shows an example technique for supporting push notifications in the example environment 100 described in Section I. Here, the data storage service 168 is seen to include multiple sub-services, including a store service 708, a push service 720, and a sync service 710. Cloud-based applications can access the store service 708, push service 720, and sync service 710 via respective service interfaces (e.g., 232, 234, and 236) from sandboxes 160 (FIG. 2). In an example, the store service 708 includes many of the above-described features from Section I for managing the creation and destruction of data storage containers 170 and for managing the storage and retrieval of data of the data storage containers 170. In accordance with additional improvements, the store service 708 further includes notification generators 730 (e.g., 730(a) and 730(b)) for detecting changes in respective data storage containers 170 (e.g., 170(a) and 170(b)) and for notifying the push service 720 of such changes. The push service 720 acts to push changes in data storage containers 170 to subscribing application instances. To this end, the push service 720 includes multiple channels 722, where a different channel (e.g., 722(a) or 722(b)) is provided for each data storage container 170 for which the push service is desired. Each channel 722 includes a notification receiver 724 (e.g., 724(a) or 724(b)) and a connection manager 726 (e.g., 726(a) or 726(b)). The sync service 710 builds upon the push service 720 and synchronizes changes in data storage containers 170 across subscribing application instances.

In operation, the store service 708 generates change notification 752 via notification generators 730 in response to changes in contents of respective data storage containers 170. Each of the notification generators 730 is configured to generate a respective change notification 752 in response to a change in any of the contents of a respective data storage container 170. Notification generators 730 are further configured to transmit the generated change notifications 752 to push service 720 for distribution to recipients. In an example, notification generators 730 are implemented with instructions within the store service 708 and may be accessible via an API.

The notification generators 730 need not have any information about intended recipients of push notifications. Rather, notification generators 730 merely respond to changes in contents of the respective data storage containers (e.g., 170(a) or 170(b)) by generating change notifications 752 and sending the change notifications to the push services 720. Each change notification 752 is specific to a respective data storage container that has changed but is agnostic to recipient devices, users, and even (in some cases) applications.

In an example, each change notification 752 is arranged to provide a compact message indicating the fact that the contents of a respective data storage container have changed without providing the actual changed content. Messages are therefore typically small and thus avoid burdening the backend system 140.

The push service 720 is configured to send change notifications 752 to subscribing application instances. It should be understood that "subscribing application instances" are application instances that subscribe to change notifications for a particular data storage container 170. Each subscription typically involves a respective connection 750 between push service 720 and each of the subscribing application instances (generally, a front-end component thereof). In some arrangements, the push service 720 subscribes an application instance to a data storage container automatically, e.g., in response to the application instance creating the data storage container 170 and/or in response to the application instance accessing the data storage container for a first time. However, subscriptions may be established in any suitable way.

The push service 720 is arranged to process change notifications using channels 722, where each channel is dedicated to a respective data storage container 170. Each channel 722 is a logical construct for organizing connections between push service 720 and any subscribing application instances. For example, channel 722(a) is configured to broadcast change notifications over connections 750 as a result of changes in data storage container 170(a). Likewise, channel 722(b) is configured to broadcast change notifications over another set of dedicated connections (not shown) as a result of changes in data storage container 170(b).

Taking channel 722(a) as an example, notification receiver 724(a) is configured to receive all change notifications 752(a) for data storage container 170(a). Notification receiver 724(a) is also configured to provide change notifications for data storage container 170(a) to connection manager 726(a) for distribution to subscribing application instances. It should be understood that, analogously, notification receiver 724(b) is configured to receive all change notifications 752(b) for data storage container 170(b) and to provide change notifications 752(b) to connection manager 726(b) for distribution to application instances subscribing to data storage container 170(b).

Connection manager 726(a) is configured to distribute change notification 752(a) for data storage container 170(a) to subscribing application instances. Along these lines, connection manager 726(a) manages dedicated connections 750 from channel 722(a) to each respective subscribing application instance. Each subscribing application instance is configured to receive change notifications via its dedicated connection 750.

Dedicated connections 750 are configured to distribute change notifications 752 to subscribing application instances. In an example, connections 750 are configured to send data to subscribing application instances via a protocol, such as HTTP or web sockets, that supports application layer communication. In some arrangements, connections 750 are persistent, one-way connections from connection managers 726 to subscribing application instances under such a protocol.

In response to receiving change notifications, application instances may respond by issuing requests 762 for the actual content of changes. In cases where the dedicated connections 750 are implemented as persistent, one-way connections, channel 722(a) is configured to receive requests 762 from the subscribing application instances over secondary connections 760, which are distinct from connections 750. For example, channel 722(a) may receive a request 762 from each subscribing application instance over a respective one of the connections 760.

In response to receipt of each request 762, channel 722(a) is configured to send changed content to the requesting application instance. It should be understood that either a dedicated connection 750 or a secondary connection 760 may be configured to provide actual changed content back to the requesting application instance.

In an example, store service 708 effects a change in contents of data storage container 170(a). When the change in the contents of data storage container 170(a) has been effected, or contemporaneously therewith, notification generator 730(a) generates change notification 752(a) indicating that a change in the contents of data storage container 170(a) has taken place.

Upon the generation of change notification 752(a), notification receiver 724(a) receives change notification 752(a) from notification generator 730(a). In an example, channel 722(a) is expressly dedicated to data storage container 170(a), and notification receiver 724(a) may constantly remain available to receive change notifications from the notification generator 730(a), i.e., in order to obtain any change notifications that concern data storage container 170(a) in real time. Connection manager 726(a) then distributes change notification 752(a) (or some notification derived thereof) over dedicated connections 750 to subscribing application instances. Examples of application instances include application frontends, such as may run on user devices. Other examples of application instances include application backends, which may run on the backend system 140.

At this point, it should be understood that there is virtually no latency between a change in contents of data storage container 170(a) and subscribing application instances being notified of the change. The ability to provide change notification 752(a) in real time to subscribing application instances is at least partially due to the significantly reduced burden on the backend system 140, which merely sends notifications of the fact that contents have changed, rather than sending the changes themselves, coupled with the ability to send the change notification 752(a) to each subscribing application instance over a respective dedicated connection 750.

Upon receiving the change notification 752(a), each of the subscribing application instances comes into possession of information that a change in contents of data storage container 170(a) has occurred. The subscribing application instances may then each respond to notification 752(a) at times determined by local considerations, e.g., based on what other activities the devices may be performing.

At some point, a subscribing application instance may respond to the change notification 752(a) to acquire the changed contents of data storage container 170(a). For example, the application instance sends a request 762 for the changed contents over secondary connection 760 between that application instance and push service 720. A typical arrangement involves secondary connection 760 being a non-persistent connection, as it is not critical that the transmission of the actual changed contents happens in real time. As an example, request 762 includes information identifying the application instance from which it originated, as well as a timestamp.

Upon receipt of request 762, the push service 720 forwards request 762 to store service 708. In response, the store service 708 retrieves changed contents 764 of data storage container 170(a) and forwards the changed contents 764 to channel 722(a). In some arrangements, connection manager 726(a) sends changed contents 764 to the requesting application instance over one of the secondary connections 760, as illustrated. In other arrangements, however, the connection manager 726(a) sends changed contents over its respective connection 750.

It should be noted that nowhere does the concept of a user enter into operations for the push notification described above. Rather, the push service 720 is preferably user-agnostic. Of course, human or other users may operate the individual devices on which application instances run. Such users may be managed by user management services 228 (FIG. 2) or by other user management, but they play no role in the above-described push notifications.

As discussed above, change notifications 752 are small enough to avoid burdening backend server 140. In some arrangements, the message contained in each change notification consists of at most sixteen characters, although in other arrangements the message may consist of more (e.g., 32, 64, 128, etc.) or fewer (e.g., 8, 4, 2, 1) characters. The message may even consist of 0 characters, i.e., the message payload may be null. Application instances may be programmed to call the backend system 140 for updates whenever they receive transmissions having null payloads.

In some arrangements, the character text provided in the change notifications 752 may indicate further detail about the change to the contents of data storage container 170(a). For example, if notification generator 730(a) has information that a change to contents of a file is a deletion, then the message may contain a "D". In this scenario, the application instance need not send any request 762, as there are no changed contents to request. Rather, the application instance may simply delete its own local copy of the file.

It should be understood that the change in the contents of a data storage container may originate from a subscribed application instance or a source external to any subscribed application instances. In the former case, for example, an application instance may direct the store service 708 to update a data storage container, and the push service 720 may act to push the change to all (or all other) subscribing application instances. In the latter case, for example, an application separate from the subscribing application instances may direct the store service 708 to update a data storage container, and the push service 720 may act to push the changes to all subscribing instances.

In some arrangements, each data storage container 170 may be subscribed to by application instances of multiple cloud-based applications. For example, a bicycling application and a general fitness application may both access the same data storage container for data common to both applications. In such cases, push notifications reflecting changes in the shared data storage container would be sent to application instances of both applications. Thus, the push service 720 operates in response to changes in data storage containers by notifying application instances, whether those application instances are instances of the same application or of different applications. Push notifications are therefore inherently application-agnostic as well as user-agnostic.

Figure 8:
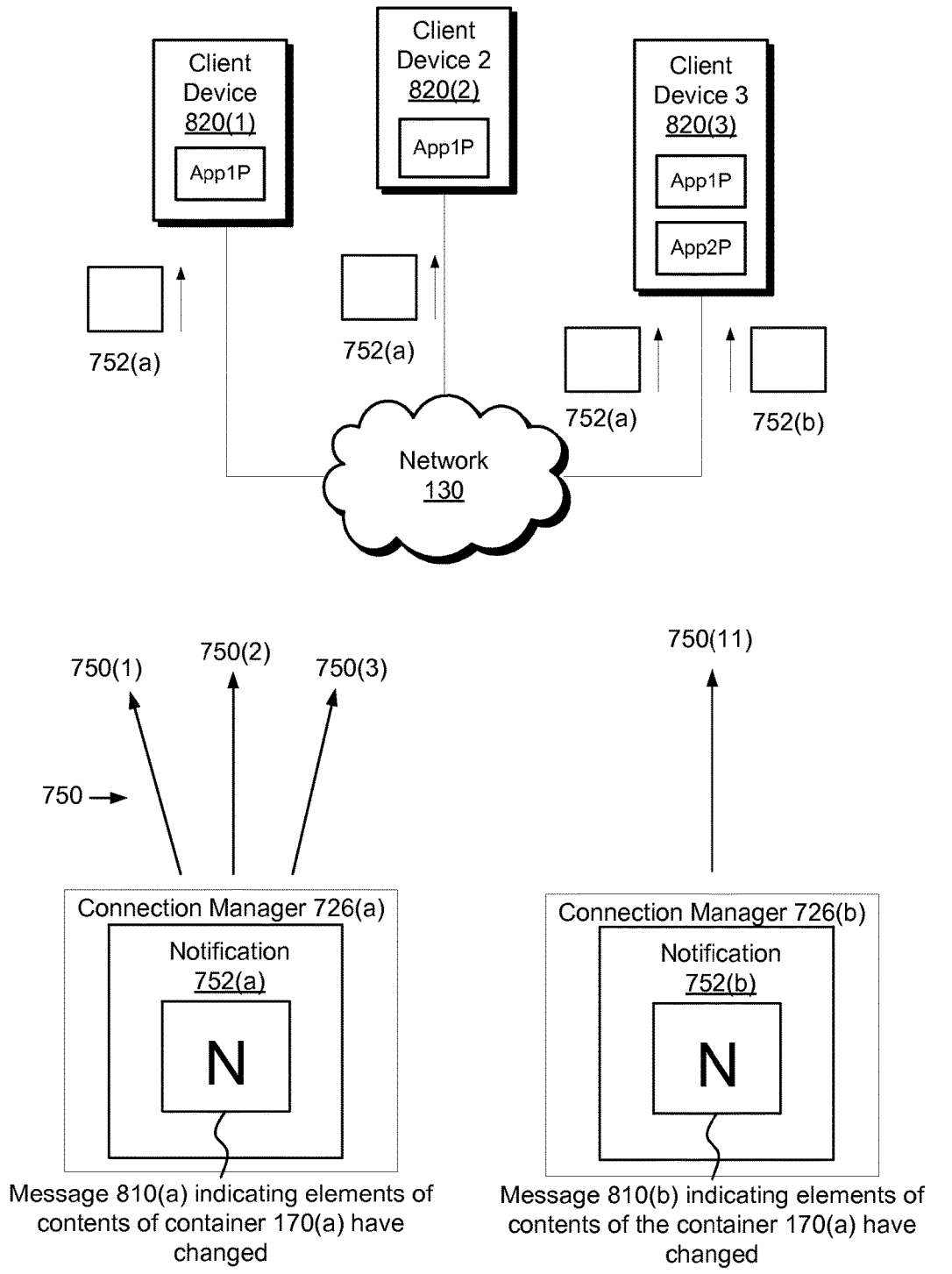
FIG. 8 is a diagram showing an example arrangement in which a logical channel resolves a change notification into subscribed application instances.

FIG. 8 shows a case in which push service 720 provides change notifications for both data storage containers 170(a) and 170(a) over channels 722(a) and 722(b) (see FIG. 7), respectively. The scenario shown in FIG. 8 illustrates the special case in which frontends of application instances run on different client devices. In FIG. 8, three client devices, 820(1), 820(2), and 820(3), each run a respective frontend instance of the first cloud-based application, i.e., App1P. Further, client device 820(3) (i.e., a single device) runs a frontend instance of the second cloud-based application, i.e., App2P. Each of client devices 820(1), 820(2), and 820(3) connect to backend server 140 via network 130.

When there is a change in the contents of data storage container 170(a), notification generator 730(a) generates change notification 752(a). Change notification 752(a) contains a message 810(a) that has a small amount of data, such as a single character ("N" for "new") that indicates that a change in the contents of data storage container 170(a) has taken place. It should be understood, though, that the message may contain any number of characters or no characters, as indicated above.

As described above in connection with FIG. 7, connection manager 726(a) of channel 722(a) distributes change notification 752(a) over dedicated connections 750. Here, the change notification 752(a) is resolved into respective connections 750(1), 750(2), and 750(3) and sent to the respective client devices 820(1), 820(2), and 820(3).

With regard to data storage container 170(b), channel 722(b) obtains generated change notification 752(b) in response to a change in data storage container 170(b). Connection manager 726(b) within channel 722(b) resolves change notification 752(b) at channel 726(b) into a single dedicated connection 750(11) to application instance App2P running on client device 820(3). Consequently, connection manager 726(b) directs notification 752(b) containing the single character, for example, of message 810(b) to the client device 820(3).

As described above, each of the data storage containers 170 may be configured for storing file data, relational data, or key-value data. Procedures for pushing requested changes to respective application instances may vary depending on the type of the data storage containers involved. For example, key-value and relational data may be sent over dedicated connections 750, while file data may be sent over secondary connections 760, as described.

The dedicated connections 750 may be provided in the form of persistent, one-way connections that use an HTTP or web sockets protocol, for example. In one example, the connection managers 726 send push notifications 752 in the form of a server-sent event over connections 750. As is known, a "server-sent event" is a real-time event raised by a server and transmitted to a client over a persistent, one-way connection. Server-sent events are sent over HTTP using HTML5 or greater. If a connection drops, the server fires an error event and automatically tries to reconnect.

An advantage of server-sent events stems from the fact that they are sent over HTTP protocol. The use of HTTP means that server-sent events are not blocked by firewalls unless the firewalls are configured to block all HTTP traffic. Also, developers can generally establish server-sent events in HTTP using simple language commands.

An alternative to server-sent events is for a developer to use web socket technology to establish persistent, one-way connections 750. We have observed, however, that some firewalls may be configured to block web socket traffic, such that server-sent events are generally more reliable.

Yet another alternative for establishing the one-way connections 750 is to use long polling technology. With long polling, each subscribing application instance opens an HTTP request with the backend system 140 and waits to receive a response from the backend system 140 over the open request. The backend system 140 may keep the request open for as long as possible. If the request times out, the respective application instance may issue a new request. When a channel 722 in the backend system 140 attempts to send a change notification 752 to the respective application instance, the channel 722 uses the open request from the application instance as the connection 750 over which to send the change notification 752.

In some examples, the push service 720 establishes a connection 750 by first attempting to use server-sent events. If the attempt succeeds, the push service 720 uses server-sent events for the connection 750. Otherwise, the push service 720 tries instead to use web socket technology. If the attempt to use web sockets fails, the push service 720 attempts to use long polling. Thus, the first choice of the push service 720 is to use server-sent events, the second choice is to use web sockets, and the third choice is to use long polling. It should be understood that the choice of technology for implementing the connections 750 may be made on a per-connection basis, such that application instances that currently support server-sent events may use them, whereas application instances that do not currently support server-sent events may use either web sockets (as a first fallback option) or long polling (as a last resort).

Figure 9:
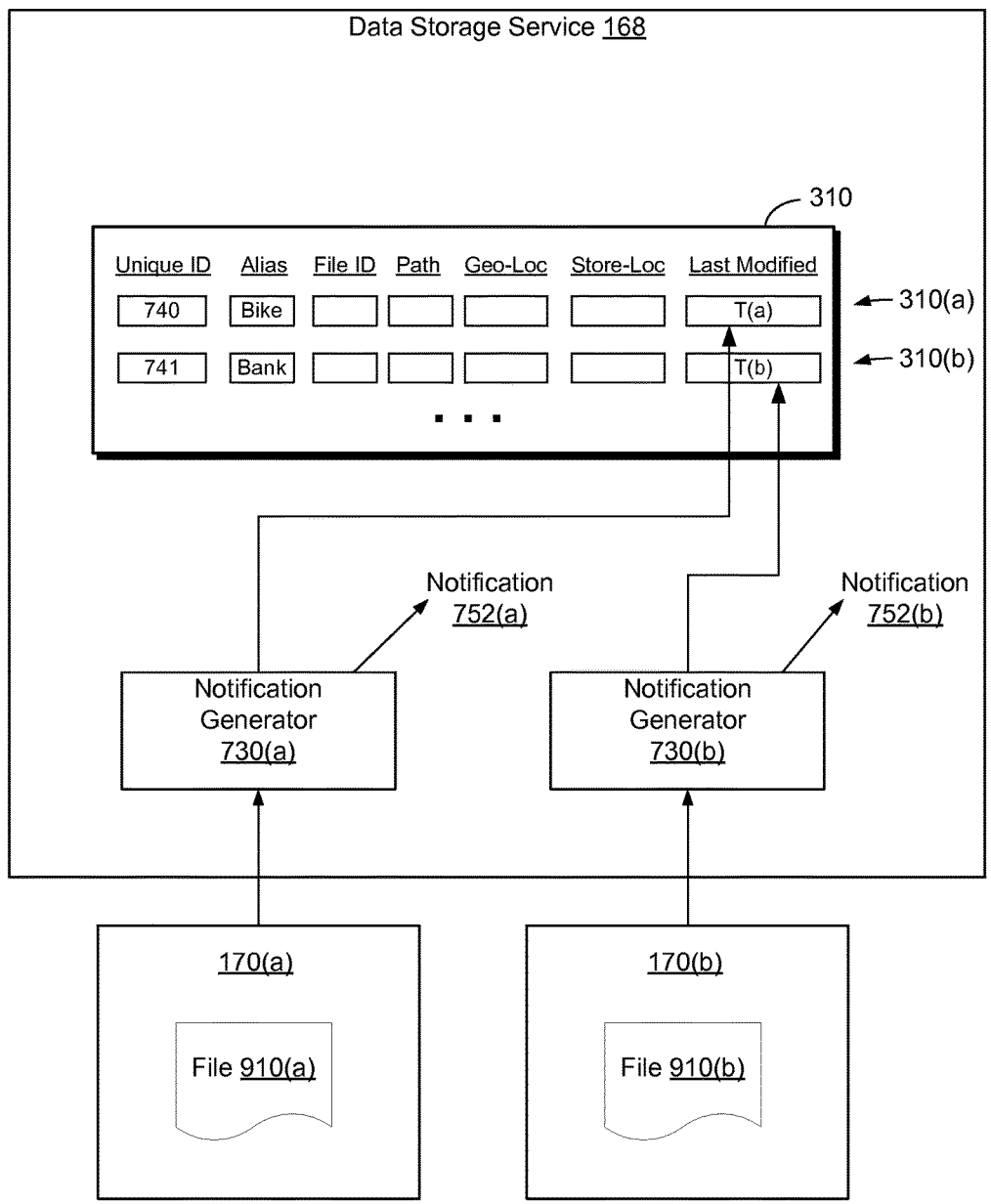
FIG. 9 is a diagram showing an example arrangement in which a change notification is generated for changes to a file stored in a data storage container.

FIG. 9 shows example operations for generating change notifications 752 for file-type data storage containers. Here, data storage containers 170(a) and 170(b) contain files 910(a) and 910(b), respectively. Also shown in FIG. 9 are data storage services 168, which are here seen to include the notification generators 730 (see also FIG. 7) and the database 310 (FIG. 3) for storing metadata for file-type data storage objects. Segregation of structures and operations among the sub-services 708, 710, and 720 (FIG. 7) are omitted from FIG. 9 for the sake of simplicity; rather, all structures and operations are merely shown as being part of the larger data storage service 168.

As described in connection with FIG. 3, database 310 is configured to store metadata describing file-type data storage containers. Here, the database 310 has an entry 310(a) that stores metadata for data storage container 170(a) and an entry 310(b) that stores metadata for data storage container 170(b). In this example, entry 310(a) specifies that data storage container 170(a) has a unique ID of 740, an alias of "Bike", and a last-modified timestamp T(a), such as Feb. 25, 2014, at 2:45 PM, for example. Similarly, entry 310(b) specifies that data storage container 170(b) has a unique ID of 741, an alias of "Bank", and a last-modified timestamp T(b), such as Feb. 25, 2014, at 3:33 PM.

Notification generators 730 are configured to update the "last modified" field of entries 310(a) and 310(b) in the database 310 each time a change is made in the contents of a respective data storage container 170. Consider a case in which an application instance subscribes to data storage container 170(a) including file 910(a). If a device on which this application instance runs has been turned off, the device may never receive change notifications 752 concerning changes in the file 910(b) while the device was off. When the device turns back on, the application instance running on the device sends a request 762 (FIG. 7) for updates to the data container 170(a). This request 762 may be sent automatically when the device turns back on, even though the device did not receive any change notification 752. The request 762 includes a timestamp indicating the last time the application instance running on the device received an update for the data storage container 170(a). Upon the backend system 140 receiving the request 762, the data storage service 168 compares the timestamp received in the request 762 with the last-modified timestamp in the database entry 310(a). Push service 720 then sends the application instance on the device contents of the data storage container 170(a) that have changed since the time indicated in the timestamp from the request 762. In this way, backend server 140 always sends all accumulated updates to the application instance, regardless of how many changes have occurred while the device was turned off.

This process of obtaining updates after the device turns back on may be repeated for each data storage container to which the application instance on the device subscribes. In some variants, the application instance running on the device may send a single request 762, which includes a timestamp indicating the last time any update to a subscribed-to data storage container was received. Upon receiving the request 762, the data storage service 168 iterates over all subscribed-to data storage containers and provides updates for each of them. If a subscribed-to data storage container contains a folder rather than a file, the data storage service 168 may iterate over all files within the folder and send updates only for the files that have changed.

Figure 10:
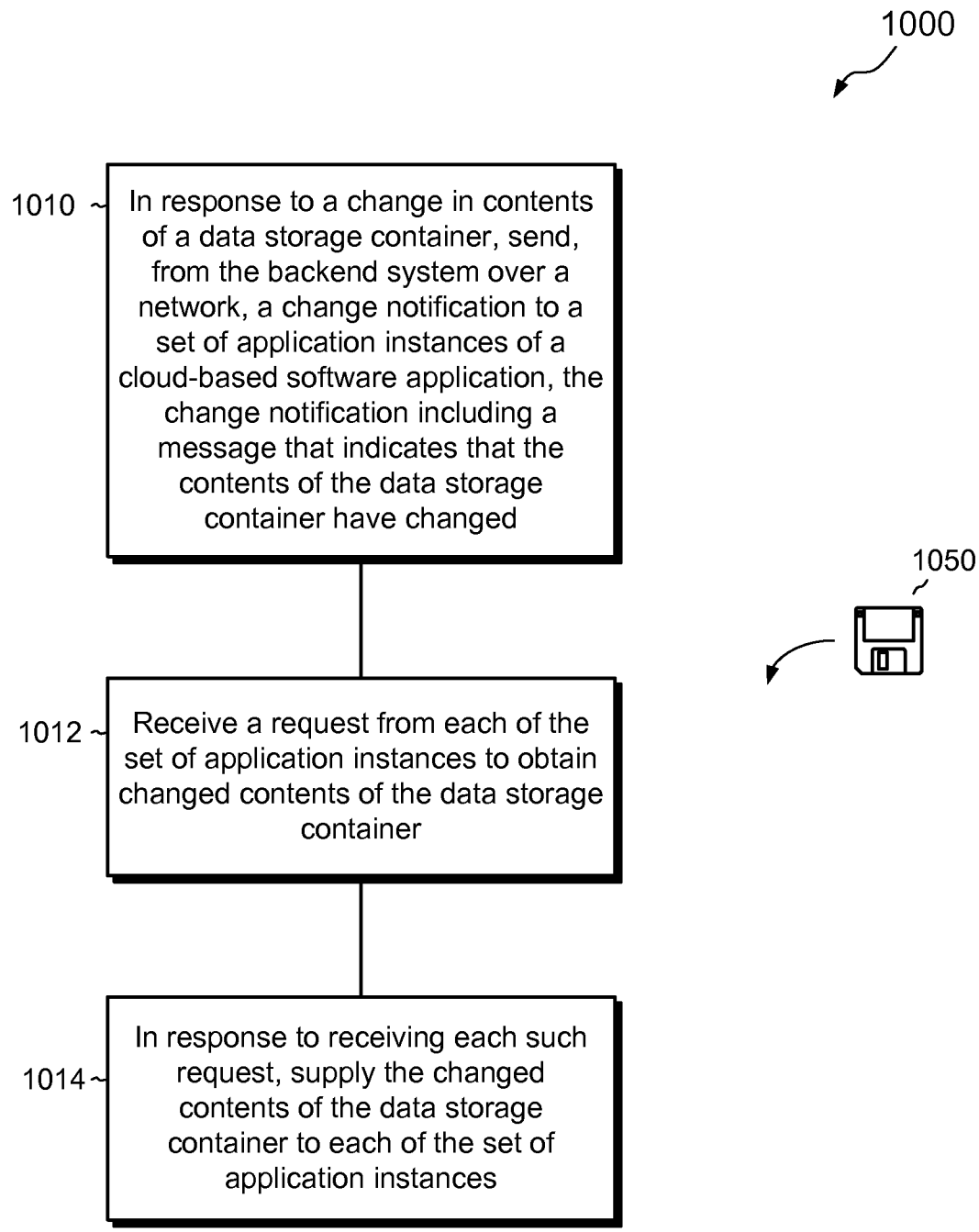
FIG. 10 is a flowchart showing an example process for providing push notifications in a backend system that provides services for supporting cloud-based software applications.

FIG. 10 shows a process 1000 that may be carried out in connection with the computing environment 100. Process 1000 is typically performed by the software constructs described in connection with FIGS. 1, 2, and 7-9, which reside in the memory 150 of backend system 140 and are run by the set of processors 144. The various acts of process 1000 may be ordered in any suitable way. Accordingly, embodiments may be constructed in which acts are performed in orders different from those illustrated, which may include performing some acts simultaneously, even though the acts are shown as sequential in the illustrated embodiments.

At step 1010, in response to a change in contents of a data storage container, a change notification is sent from a backend system over a network to a set of application instances of a cloud-based software application, the change notification including a message that indicates that the contents of the data storage container have changed. For example, suppose that an application instance running on a client device 120(1) updates data stored in data storage container 170(a). Upon this updating, notification generator 730(a) generates change notification 752(a). Notification receiver 724(a) in channel 722(a) obtains change notification 752(a), and connection manager 726(a) distributes change notification 752(a) to other application instances over respective, dedicated connections 750.

At step 1012, a request is received from each of the set of application instances to obtain changed contents of the data storage container. To continue the above example, each of the application instances would send a request 762 to obtain the changes in response to receiving change notification 752(a). Because, in this example, this request is from a client and is sent to backend system 140, each application instance may send request 762 over a secondary connection 760 distinct from dedicated connections 750.

At step 1014, in response to receiving each such request, the changed contents of the data storage container are supplied to each of the set of application instances. To continue the above example, push service 720 may send changes 764 to each of the requesting application instances over either dedicated connections 750 or secondary connections 760.

An improved technique has been described that pushes data changes from a backend system to one or more application instances running on frontend clients by sending compact change notifications that merely inform the application instance(s) that contents of data stored on the backend system have changed. A push service 720 obtains a change notification 752 generated in response to a data change in a data storage container 170. Push service 720 then sends the change notification 752 to subscribing application instances over dedicated connections 750. Each subscribing application instance may then request the data changes over a secondary connection 760. Because the change notifications are compact, they do not burden the backend system. Also, because transmissions of actual changes in data generally are not time-critical, such changes may be performed reliably out of band with incoming requests, as backend system resources allow.

Having described certain embodiments, numerous alternative embodiments or variations can be made. For example, although the above examples described scenarios involving multiple subscribers, there are scenarios that involve only one subscriber; in this case, the subscriber would not have to call back. Further, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1050 in FIG. 10). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of providing push notifications in a backend system that provides services for supporting cloud-based software applications, the method comprising:

in response to a change in contents of a data storage container, sending, from the backend system over a network, a change notification to a set of application instances of a cloud-based software application, the change notification including a message that indicates that the contents of the data storage container have changed;

receiving a request from each of the set of application instances to obtain changed contents of the data storage container; and in response to receiving each such request, supplying the changed contents of the data storage container to each of the set of application instances, wherein the method further comprises, prior to sending the change notification, creating the data storage container by data storage services operating on the backend system, the data storage container (i) providing a logical container for storing data and (ii) having no assignment by the data storage services to any end user of the cloud-based application, the data storage container being one of a set of multiple data storage containers storing data of the cloud-based software application on a same server in the backend system, wherein the method further comprises establishing a persistent connection between each of the set of data storage containers and each of the set of application instances, each persistent connection being dedicated to one and only one of the data storage containers such that no two data storage containers share the same persistent connection,
wherein sending the change notification indicating that the contents of the data storage container have changed includes transmitting the change notification to each of the set of application instances over the network via the respective, persistent connection, and
wherein receiving the request from each of the set of application instances to obtain the changed contents of the data storage container includes receiving each such request over a communication channel distinct from the respective, persistent connection.

2. A method as in claim 1, wherein sending the change notification to the set of application instances includes:
sending the change notification to each of the set of application instances over the respective, persistent connection as a respective server-sent event, each server-sent event being a real-time event raised by the backend system, transmitted to the respective application instance over HTTP (Hypertext Transfer Protocol), and realized as a standardized feature conforming to HTML5 (Hypertext Markup Language, Version 5) or a later version, in which a server fires an error event and automatically attempts a reconnect in response to a dropped connection.

3. A method as in claim 1, wherein sending the change notification to the set of application instances includes:
first, attempting to send the change notification as a respective server-sent event to each of the set of application instances;
second, when the first attempting fails, attempting to send the change notification to each of the set of application instances using web socket technology; and
third, when the first and second attempting fails, attempting to send the change notification to each of the set of application instances using long polling over HTTP.

4. A method as in claim 1, further comprising:
in response to the change in an element of the contents of the data storage container, generating a timestamp indicating a time at which the element was changed.

5. A method as in claim 4, wherein the element of the contents of the data storage container is a file;
wherein the method further comprises:
configuring the data storage container to store a set of files, each of the set of files represented as an entry in a metadata database, the entry having a timestamp indicating a time at which that file was most recently changed.

6. A method as in claim 5, wherein supplying the changed contents of the data storage container to each of the set of application instances includes:
for each of the set of application instances, (i) identifying files stored in the data storage container that have changed since a request was last received from the respective application instance, and (ii) sending data of the identified files to the respective application instance.

7. A method as in claim 1, wherein sending the change notification includes:
providing the change notification to the set of application instances via a logical channel dedicated to the data storage container; and
resolving the change notification at the logical channel into the respective persistent, one-way connection to each of the set of application instances.

8. A method as in claim 7, wherein the message consists of a set of characters having between zero and 16 characters to describe the fact that the contents of the data storage container have changed; and
wherein resolving the change notification at the logical channel into the respective persistent, one-way connection to each of the set of application instances includes:
sending the set of characters to each of the set of application instances.

9. A method as in claim 1, further comprising:
in response to a change in contents of another data storage container, sending another change notification to another set of application instances of the cloud-based software application, the other set of application instances being subscribed to change notifications for the other data storage container, the other change notification being distinct from the change notification and including a message indicating that the contents of the other data storage container have changed;
receiving requests from each of the other set of application instances to obtain changed contents of the other data storage container; and
in response to receiving the requests, supplying the changed contents of the other data storage container to each of the other set of application instances.

10. A method as in claim 1,
wherein the data storage container is shared between a first user and a second user of the cloud-based software application, and
wherein supplying the changed contents to each of the set of application instances includes supplying the changed contents to a first set of application instances used by the first user and a second set of application instances used by the second user.

11. An electronic apparatus constructed and arranged to provide push notifications in a backend system that provides services for supporting cloud-based software applications, the electronic apparatus comprising:
a network interface; and
a controller including memory and control circuitry coupled to the memory, the controller constructed and arranged to:
in response to a change in contents of a data storage container, send, from the backend system over a network, a change notification to a set of application instances of a cloud-based software application, the change notification including a message that indicates that the contents of the data storage container have changed;
receive a request from each of the set of application instances to obtain changed contents of the data storage container; and
in response to receiving each such request, supply the changed contents of the data storage container to each of the set of application instances, the data storage container being one of a set of multiple data storage containers storing data of the cloud-based software application on a same server in the backend system, each of the set of data storage containers having a dedicated, persistent connection with each of the set of application instances, each dedicated, persistent connection being dedicated to one and only one of the data storage containers such that no two data storage containers share the same dedicated, persistent connection, wherein the controller, constructed and arranged to send the change notification, is further constructed and arranged to:

send the change notification indicating that the contents of the data storage container have changed over the network via the dedicated, persistent connection between the backend system and each of the set of application instances, and wherein, when constructed and arranged to receive the request from each of the set of application instances to obtain the changed contents of the data storage container, the controller is further constructed and arranged to receive each such request over a communication channel distinct from the dedicated, persistent connection.

12. An apparatus as in claim 11, wherein the controller is further constructed and arranged to:

prior to sending the change notification and in response to receiving a request from the cloud-based application, direct a data storage service in the backend system to create the data storage container in a set of storage devices, the data storage container (i) providing a logical container for storing data and (ii) having no assignment by the data storage services to any end user of the cloud-based application.

13. An apparatus as in claim 11, wherein, when constructed and arranged to transmit the change notification, the controller is further constructed and arranged to:

send the change notification to each of the set of application instances over the respective, persistent connection as a respective server-sent event, each server-sent event being a real-time event raised by the backend system, transmitted to the respective application instance over HTTP (Hypertext Transfer Protocol), and realized as a standardized feature conforming to HTML5 (Hypertext Markup Language, Version 5) or a later version.

14. A non-transitory, computer-readable storage medium including instructions which, when executed by control circuitry, cause the control circuitry to perform a method of providing push notifications in a backend system that provides services for supporting cloud-based software applications, the method comprising:

in response to a change in contents of a data storage container, sending, from the backend system over a network, a change notification to a set of application instances of a cloud-based software application, the change notification including a message that indicates that the contents of the data storage container have changed;

receiving a request from each of the set of application instances to obtain changed contents of the data storage container; and in response to receiving each such request, supplying the changed contents of the data storage container to each of the set of application instances, the data storage container being one of a set of multiple data storage containers storing data of the cloud-based software application on a same server in the backend system, wherein the method further comprises establishing a persistent connection between each of the set of data storage containers and each of the set of application instances, each persistent connection being dedicated to one and only one of the data storage containers such that no two data storage containers share the same persistent connection, wherein sending the change notification indicating that the contents of the data storage container have changed includes transmitting the change notification to each of the set of application instances over the network via the respective, persistent connection, and wherein receiving the request from each of the set of application instances to obtain the changed contents of the data storage container includes receiving each such request over a communication channel distinct from the respective, persistent connection.

15. The method of claim 1, further comprising, in response to a deletion of contents of a second data storage container, sending a second change notification to the set of application instances, the second change notification including a message that indicates that the contents of the second data storage container have been deleted, the second change notification directing the set of application instances to delete the contents of the second data storage container without requesting further information about changed contents of the second data storage container.

16. The method of claim 1, wherein the set of application instances are subscribed to change notifications for the data storage container, and wherein the backend system subscribes at least one of the set of application instances to the data storage container automatically in response to the application instance accessing the data storage container for a first time.

17. The method of claim 16, further comprising:

storing a set of files in the data storage container, each of the set of files represented by a respective entry in a metadata database stored in the backend system, each entry having a respective timestamp indicating a time at which the file represented by the respectively entry was most recently changed, wherein supplying the changed contents of the data storage container to each of the set of application instances includes, for each of the set of application instances, (i) identifying files stored in the data storage container that have changed since a request was last received from the respective application instance for an update of the data storage container, and (ii) sending data of the identified files to the respective application instance.

* * * * *